April 17, 1962  F. WICKS  3,029,942
TRASH ELIMINATOR FOR POTATO DIGGER
Filed July 3, 1958  3 Sheets-Sheet 1
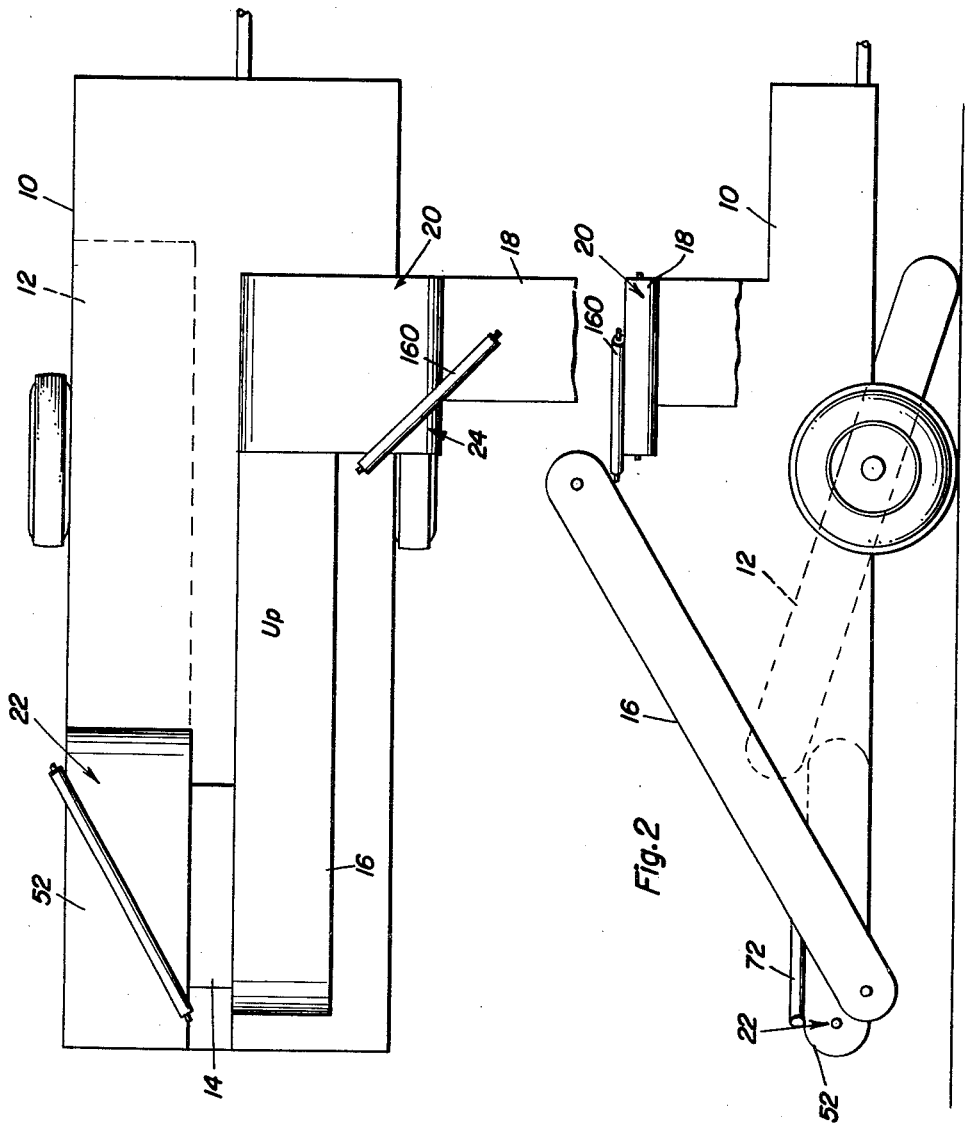
Frederick Wicks
INVENTOR.

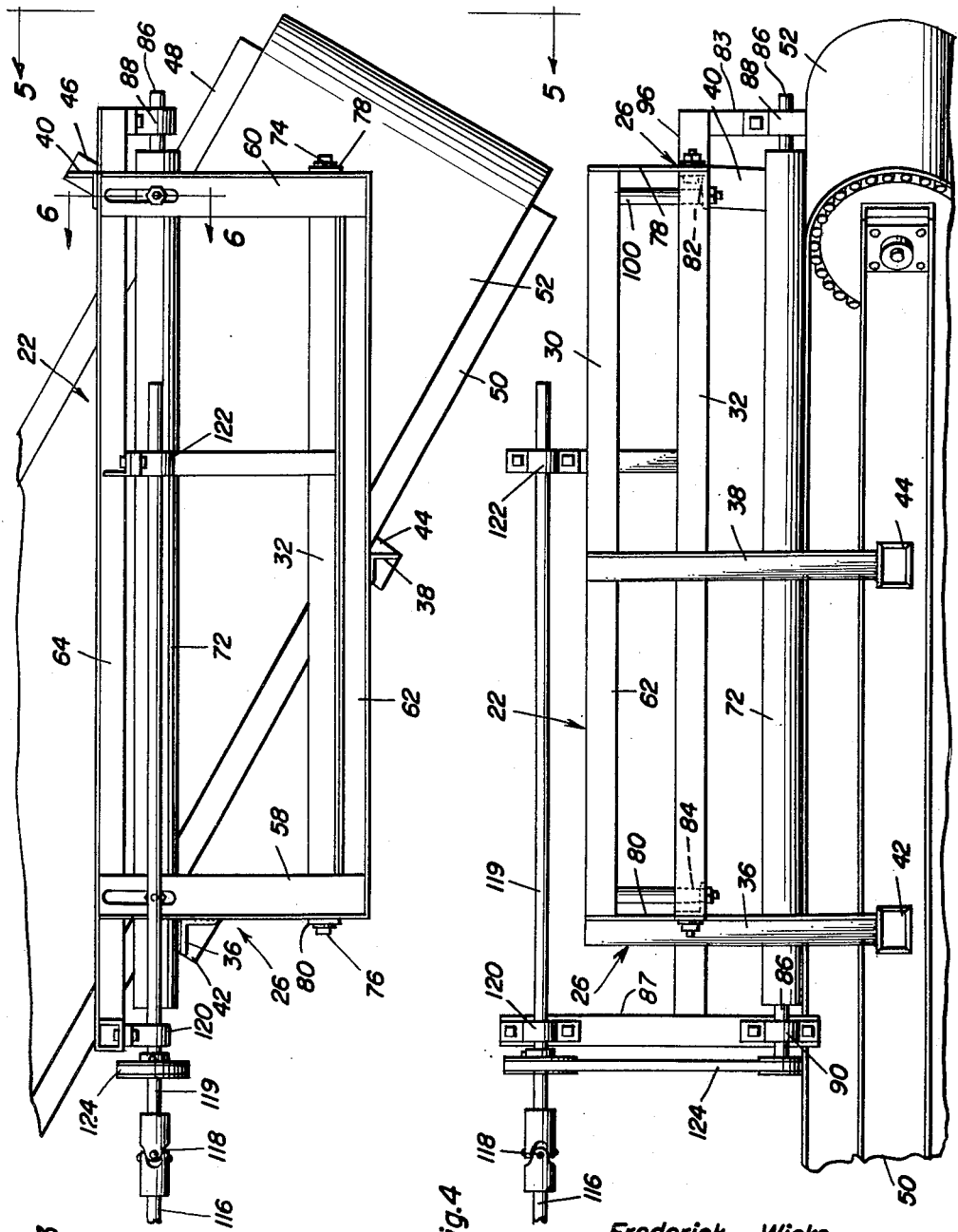

April 17, 1962 F. WICKS 3,029,942
TRASH ELIMINATOR FOR POTATO DIGGER
Filed July 3, 1958 3 Sheets-Sheet 3
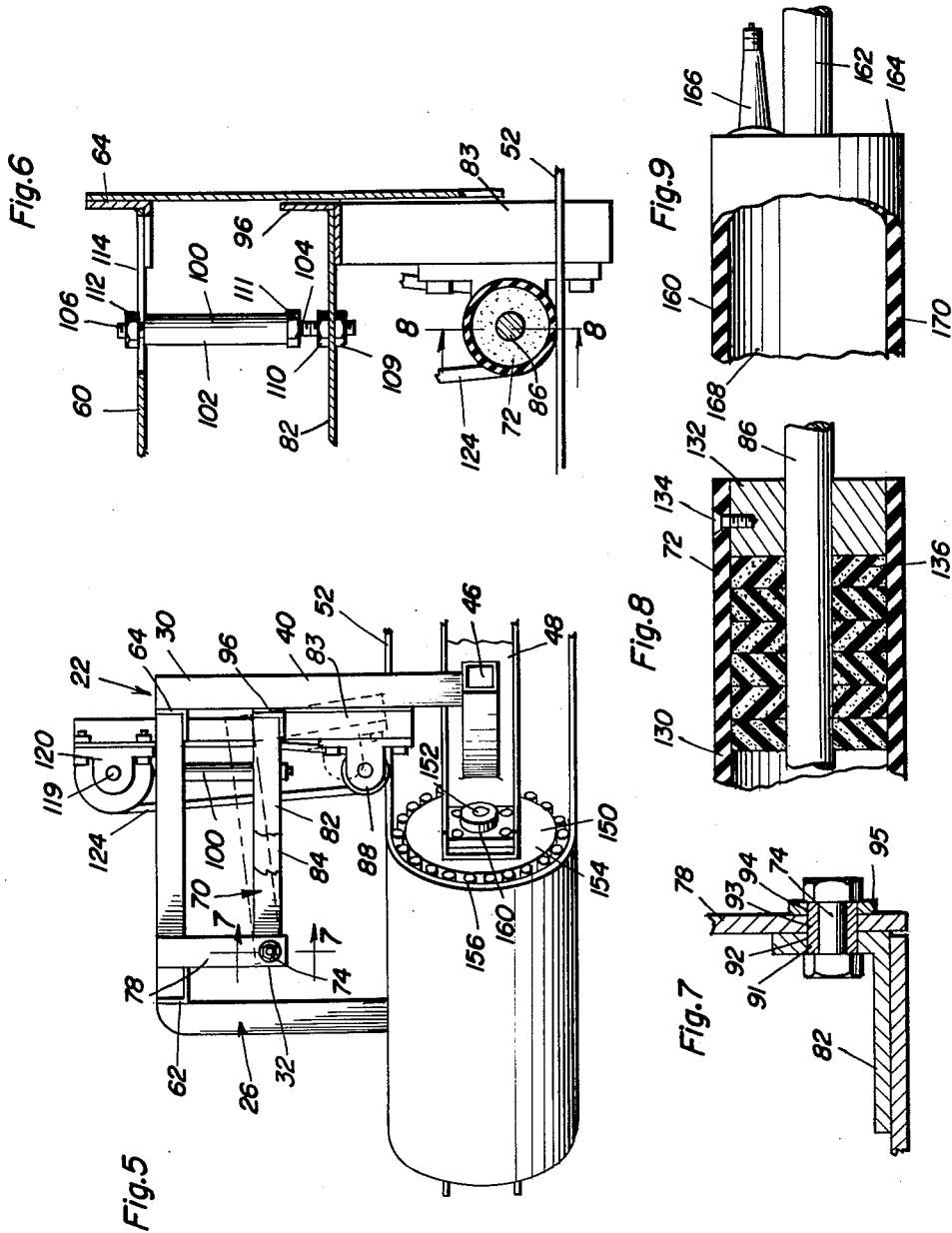
Frederick Wicks
INVENTOR.

United States Patent Office 3,029,942
Patented Apr. 17, 1962

3,029,942
TRASH ELIMINATOR FOR POTATO DIGGER
Frederick Wicks, Wicks Road, Commack, N.Y.
Filed July 3, 1958, Ser. No. 746,548
10 Claims. (Cl. 209—90)

This invention relates to potato digging machines and more particularly to a trash eliminating attachment for any one of the conventional potato diggers that is commercially available.

Potatoes are grown in rows or ridges in fields, and the rows or ridges are generally set at 36 inches apart. The potato digger is set up so that the digger wheels and digging shoes are matched to space the rows of planted potatoes. The digger is drawn through the field by a tractor, and as the potatoes are dug out of the ground by the digger shoes and are carried up onto the conveyor belts, there is carried with the potatoes a quantity of soil, weeds, grass and other foreign material which must be removed prior to the time that the potatoes are graded and bagged.

An object of the present invention is to provide a trash eliminator on the potato digging machine, the eliminator extracting and returning to the earth, a very high percentage of the soil, weeds, grass, stones and other foreign matter.

The eliminator is embodied in two rollers and conveyor belts that are disposed at two different stages of the conventional potato digging machine. The first roller is arranged at an angle of approximately 33° to the path of travel of the potatoes and debris and is superposed over the first trash eliminator conveyor belt. The roller is of special construction and mounted in a special way to eliminate the debris which does not resemble potatoes in size and texture. The roller is constructed of heavy-duty materials, but is so arranged that the resilience of the roller can be altered in accordance with the desires and needs of each particular farmer.

The second roller and conveyor combination in the trash eliminator is constructed different although the mounting of the second roller is the same as the mounting of the first roller. The second roller is inflatable to a selected pressure and operates a short distance, for instance an inch or an inch and a quarter above the second trash eliminator conveyor. This roller is set at an angle of approximately 45° to the general path of travel of the potatoes, small stones and the like possessing dimensions and shapes and textures much like potatoes. Therefore, the small potatoes, for instance below an inch or an inch and a quarter in diameter, plus the foreign objects, as stones below the same dimensions, are passed beneath the second eliminator roller and the second eliminator conveyor and returned to the soil. It is noted that potatoes of such small size are ordinarily returned to the soil anyway since they are too small to be of any commercial value.

Each of the eliminator rollers are mounted so that they can adjust up and down. This is accomplished by having pairs of frames, one being stationary and the other being floating to allow trash, grass and other foreign items to pass between the roller and conveyor belt.

Both of the trash eliminator rollers are power driven with the first roller driven at a much greater rate of speed than the second roller in order to achieve optimum elimination.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic top view of a conventional potato digger having a trash eliminator in accordance with the invention mounted thereon.

FIGURE 2 is a side elevational diagrammatic view showing principally the second stage of elimination and how it is achieved.

FIGURE 3 is a top view of the first part of the trash eliminator.

FIGURE 4 is an elevational fragmentary view taken from one side of the first part of the eliminator, that is, the first conveyor and its supporting frame assembly.

FIGURE 5 is an end elevational view of the structure in FIGURE 3 and taken approximately on the line 5—5 of FIGURE 3.

FIGURE 6 is an enlarged elevational sectional view taken on the line 6—6 of FIGURE 3.

FIGURE 7 is an enlarged elevational sectional view showing a pivot mount structure and taken on the line 7—7 of FIGURE 5.

FIGURE 8 is an enlarged fragmentary sectional view showing the internal construction of the first eliminator roller and taken on the line 8—8 of FIGURE 6.

FIGURE 9 is a fragmentary elevational view of the second roller, parts shown in section, the second roller being inflatable to any desired pressure.

In the accompanying drawings there is a conventional potato digger 10 diagrammatically shown. This conventional potato digger schematically represents any of the manufacturers' makes of potato diggers that are now in use or commercially available. Since the trash eliminator can be applied to any potato digger, and all available potato diggers operate with generally the same structure and on generally the same theories of operation, many of the conventional potato digging parts are omitted so as to prevent obscuring the eliminator which is the subject of the invention. In potato diggers, the potatoes are dug and conveyed along a potato digging conveyor 12 to a transverse conveyor 14 after which they are moved to another conveyor 16 angled upwardly. Then the potatoes are deposited on a discharge conveyor 18 which ordinarily connects with a truck, cart, or the like. This conveyor has a work hand platform 20 adjacent to it.

The trash eliminator constructed in accordance with the invention is made in two stages or parts 22 and 24 respectively. The first stage or part 22 has its frame supporting structure 26 shown in detail. The frame structural support for the second part or stage 24 is essentially the same and therefore, is not shown in minute detail. Supporting structure 26 is constructed of a stationary frame 30 and a floating frame 70 composed of members 82, 84 and 32. The stationary frame is composed of three upright frame members 36, 38 and 40 respectively which are attached onto laterally protruding mounting brackets 42, 44 and 46 that are fixed to the frame sides 48 and 50 of the first eliminator conveyor 52. Frame members 36 and 38 are attached to one side of the frame of conveyor 52 while frame member 40 is attached on the opposite side of the conveyor 52. A pair of upper frame members 58 and 60 are secured to the upright frame members 40 and 36 respectively, and there is a top or upper frame member 62 attached to frame members 58 and 60 plus a parallel top frame member 64 attached to frame members 58 and 60 at the opposite ends thereof.

The floating frame 70 supports roller 72 on a pair of pivot bolts 74 (FIGURE 7) and 76 on hangers 78 and 80 that are attached to and depend from the upper frame members 58 and 60. The floating frame 70 has a pair of L-shaped frame members 82, 83 and 84, 87 connected at their forward ends to member 32 and at their lower ends to blocks 88 and 90. The members 82 and 84 are L-shaped in cross-section as shown in FIGURE 7. Roller 72 has a spindle 86 mounted in self-aligning bearings carried by pillar blocks 88 and 90 on the upright part of the L-shaped frame members 83 of the floating frame by means of vertical members 83 and 87. A detail of the pivot 74 is shown in FIGURE 7. As seen in this figure the pivot consists of a bolt passed through bearing or bushing 91 that is located in aligned holes 92, 93 and 94 in the L-shaped floating frame member 82, the hanger 78 and a washer 95 respectively. The same construction exists for pivot 76.

The L-shaped frame members have cross members 96 that hold them spaced apart the proper distance to support the roller spindle 86. In addition, there are means to adjust the height of the roller 72 from the surface of conveyor 52. These means consist of adjustment assemblies 100 capable of elongating or retracting. For instance a rubber sleeve 102 with bolts 104 and 106 molded into the ends and attached respectively to a floating frame cross member 96 and one of the frame members 60. Nuts 109, 110, 111 and 112 are on the bolts 104 and 106, fastening the assembly in place on the last mentioned frame members, one of which has slot 114 therein for adjustment of the assembly shown in FIGURE 6.

Roller 72 is power operated from shaft 116 that attaches to a part of the potato digger capable of surrendering power or to the tractor that draws the potato digger through the fields. A universal joint 118 is attached to shaft 116 and to a countershaft 119 mounted in bearings 120 and 122 on the floating frame. A belt 124, drive chain or the like is connected with the countershaft 119 and with one end of spindle 86. When the belt is used, the drive connection between countershaft 119 and the spindle 86 will be made by pulleys. When a chain is used, sprockets will be necessary. By virtue of this construction the roller 72 can be adjusted up or down since the floating frame is capable of restricted up and down movement. This is necessary to permit trash, debris such as vines and soil to roll and be propelled between the conveyor 52 and the roller 72, while the larger potatoes are bumped by the roller and carried across transverse conveyor 14 and onto the upwardly directed conveyor 16 (FIGURE 1).

Roller 72 is of special construction. It is made of a rubber or other elastomeric material and is constructed of a sleeve 130 concentric on spindle 86 and attached by bolts 134 at its ends to metal disks 132 on the roller spindle 86. A plurality of sponge rubber or other soft material wafers 136 are slipped onto spindle 86 and are contained within the sleeve 130. The number of wafers and the compressive load under which they are place by disks 132, will determine the softness or firmness of roller 72.

Conveyor 52 is made of an endless belt on the previously mentioned conveyor frame. The ends of the conveyor belt support special rollers 150 each made up of a roller shaft 152 that has circular end plates 154 connected to it. A number of transverse rods 156 are fixed to the periphery of the end plates 154 (FIGURE 5) and form a foundation on which to support the belt of the conveyor 52. This construction is adopted for the purpose of keeping the conveyor clean, that is, preventing dirt and the many small stones and the like that are encountered in ordinary potato digging operations, from getting between the belt and the rollers that support the belt. Hence, the conveyor 52 operates in a comparatively clean condition.

Conveyor 52 is supported by having its shafts 152 in bearings 160, there being two such bearings for each conveyor roller and each bearing is adjustably secured to the sides 48 and 50 respectively of the conveyor frame. One of the shafts 152 has a pulley and chain drive attached to a source of power on the potato digging machine. The belt travels at a comparatively high rate of speed to propel the potatoes and debris so that the trash that can fit between the floating frame supported roller 72 and the surface of conveyor 52 will be discharged from the potato digger and returned to the earth, while the potatoes are bumped against the roller 72. Due to the angularity of the roller with respect to the average or general path of travel of the potatoes, they are deposited on transverse conveyor, once they travel to conveyor 16.

As shown in FIGURE 2 the conveyor 16 discharges onto the second conveyor 20 of the trash eliminator. This conveyor is constructed the same way and driven in the same way as conveyor 52 of the first part or stage 22 of the trash eliminator attachment for the potato digger 10. Roller 160 is mounted by a floating frame supported by a movable frame identical to the floating and stationary frames that support roller 72. However, roller 160 extends at an angle of approximately 45° to the path of travel of the conveyor of the second stage or part of the eliminator. In addition, roller 160 is across one corner of this conveyor and is constructed somewhat different from roller 72. As seen in FIGURE 9, roller 160 has a roller shaft or spindle 162 attached to an end wall 164 within which valve stem 166 is attached. The valve stem is an inflation member and contains a valve core (not shown) the same as an automobile valve stem and core combination. The roller body has a cavity 168 within a rubber or other elastomeric material cylinder 170, the cavity adapted to be inflated with air under a selected pressure so that the firmness of the roller 160 can be altered.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a potato digger which has a first conveyor, a second conveyor and means for operating the conveyors to propel the potatoes and debris through a path of travel in the potato digger, a trash eliminator comprising a part including an eliminator conveyor carried by the potato digger and in alignment with the first conveyor to receive the potatoes and debris therefrom, a stationary frame, a first eliminator conveyor frame supporting said first eliminator conveyor and to which said stationary frame is secured, a floating frame, guide means connecting said floating frame to said stationary frame whereby said frames may freely move in a vertical direction relative to each other, a roller carried by said floating frame and superposed over said first eliminator conveyor, means drivingly connected to said roller for rotating said roller above said first eliminator conveyor so that the potatoes and like sized and textured objects can bump onto the first roller while the debris will elevate said roller and floating frame so as to pass between said roller and said first eliminator conveyor.

2. A device as defined in claim 1 wherein said roller is resilient and has a substantially smooth surface.

3. In a potato digger which has a first conveyor, a second conveyor and means for operating the conveyors to propel the potatoes and debris through a path of travel in the potato digger, a trash eliminator comprising a first part including a first eliminator conveyor carried by the potato digger and in alignment with the first conveyor to receive the potatoes and debris therefrom, a stationary frame, a first eliminator conveyor frame supporting said first eliminator conveyor and to which said stationary frame is secured, a floating frame, guide means connecting said floating frame to said stationary frame whereby said frames may freely move in a vertical direction relative to each other, a roller carried by said floating frame and superposed over said first eliminator conveyor, means drivingly connected to said roller for rotating said roller above said first eliminator conveyor so that the potatoes and like sized and textured objects can bump onto the first roller while the debris will elevate said roller and floating frame so as to pass between said roller and said first eliminator conveyor, a second part of said eliminator connected to the potato digger and located at the discharge end of said second potato digger conveyor, said second part of said eliminator including a second eliminator conveyor, a second eliminator roller, means supporting said second eliminator roller over said second eliminator conveyor and at an angle to the path of travel of the potatoes and slightly above the surface of said second eliminator conveyor.

4. In a potato digger which has a first conveyor, a second conveyor and means for operating the conveyors to propel the potatoes and debris through a path of travel in the potato digger, a trash eliminator comprising a first part including a first eliminator conveyor carried by the potato digger and in alignment with the first conveyor to receive the potatoes and debris therefrom, a stationary frame, a first eliminator conveyor frame supporting said first eliminator conveyor and to which said stationary frame is secured, a floating frame, guide means connecting said floating frame to said stationary frame whereby said frames may freely move in a vertical direction relative to each other, a roller carried by said floating frame and superposed over said first eliminator conveyor, means drivingly connected to said roller for rotating said roller above said first eliminator conveyor so that the potatoes and like sized and textured objects can bump onto the first roller while the debris will elevate said roller and floating frame so as to pass between said roller and said first eliminator conveyor, a second part of said eliminator connected to the potato digger and located at the discharge end of said second potato digger conveyor, said second part of said eliminator including a second eliminator conveyor, a second eliminator roller, means supporting said second eliminator roller over said second eliminator conveyor and at an angle to the path of travel of the potatoes and slightly above the surface of said second eliminator conveyor, said second eliminator roller including a flexible cylinder having a cavity therein, and means for introducing air under pressure into said cavity to thereby vary the firmness of said second roller.

5. In a potato digger which has a first conveyor, a second conveyor and means for operating the conveyors to propel the potatoes and debris through a path of travel in the potato digger, a trash eliminator comprising a first part including a first eliminator conveyor carried by the potato digger and in alignment with the first conveyor to receive the potatoes and debris therefrom, a stationary frame, a first eliminator conveyor frame supporting said first eliminator conveyor and to which said stationary frame is secured, a floating frame, means movably connecting said floating frame to said stationary frame, a roller carried by said floating frame and superposed over said first eliminator conveyor, said roller having a smooth surface, means drivingly connected to said roller for rotating said roller above said first eliminator conveyor so that the potatoes and like sized and textured objects can bump onto the first roller while the debris is passed between said roller and said first eliminator conveyor, a second part of said eliminator connected to the potato digger and located at the discharge end of said second potato digger conveyor, said second part of said eliminator including a second eliminator conveyor, a second eliminator roller, means supporting said second eliminator roller over said second eliminator conveyor and at an angle to the path of travel of the potatoes and slightly above the surface of said second eliminator conveyor, said second eliminator roller including a flexible cylinder having a cavity therein, and means for introducing air under pressure into said cavity to thereby vary the firmness of said second roller, at least one of said eliminator conveyors including a conveyor belt, a pair of rolls around which said belt is entrained, each roll constructed of a shaft to which end plates of circular formation are connected, a plurality of rods extending between said end plates and attached to the periphery thereof and spaced from each other to provide spaces therebetween and to form a supporting surface for the conveyor belt.

6. In a trash eliminator for a potato digger, the combination of an eliminator conveyor having a conveyor belt, a stationary frame, a conveyor frame supporting said conveyor and to which said stationary frame is secured, a floating frame, means pivotally mounting said floating frame on said stationary frame and above said conveyor, said floating frame having L-shaped frame members with ends, one end of each L-shaped frame member connected with said pivotally mounting means, a roller connected with the other of said ends of each of said L-shaped frame members.

7. In a trash eliminator for a potato digger, the combination of an eliminator conveyor having a conveyor belt, a stationary frame, a conveyor frame supporting said conveyor and to which said stationary frame is secured, a floating frame, means pivotally mounting said floating frame on said stationary frame and above said conveyor, said floating frame having L-shaped frame members with ends, one end of each L-shaped frame member connected with said pivotally mounting means, a roller connected with the other of said ends of each of said L-shaped frame members, said roller including a spindle, a flexible cylindrical cover on said spindle, and means including compressible wafers between said cylinder and said spindle and compressed therebetween to form a firm resilient body in said roller.

8. In a trash eliminator for a potato digger, the combination of an eliminator conveyor having a conveyor belt, a stationary frame, a conveyor frame supporting said conveyor and to which said stationary frame is secured, a floating frame, means pivotally mounting said floating frame on said stationary frame and above said conveyor, said floating frame having L-shaped frame members with ends, one end of each L-shaped frame member connected with said pivotally mounting means, a roller connected with the other of said ends of each of said L-shaped frame members, said roller extending at least partially across said conveyor and at an angle to the path of movement of the conveyor, a second trash eliminator conveyor adapted to be placed remote from said first conveyor, a second roller, means supporting said second roller over said second eliminator conveyor and at an angle to the path of movement of said eliminator conveyor.

9. The eliminator of claim 8 wherein said second roller has a cavity, and means for introducing air under pressure into said cavity to vary the firmness of said second roller.

10. In a potato digger which has a first conveyor, a second conveyor and means for operating the conveyors to propel the potatoes and debris through a path of travel in the potato digger, a trash eliminator comprising a first part including a first eliminator conveyor carried by the potato digger and in alignment with the first conveyor to receive the potatoes and debris therefrom, a stationary frame, a first eliminator conveyor frame supporting said first eliminator conveyor and to which said stationary frame is secured, a floating frame, means movably connecting said flloating frame to said stationary frame, a roller carried by said flloating frame and superposed over said first eliminator conveyor, said roller including means by which the firmness of the roller can be varied, means drivingly connected to said roller for rotating said roller above said first eliminator conveyor so that the potatoes and like sized and textured objects can bump onto the first roller while the debris is passed between said roller and said first eliminator conveyor, a second part of said eliminator connected to the potato digger and located at the discharge end of said second potato digger conveyor, said second part of said eliminator including a second eliminator conveyor, a second eliminator roller, means supporting said second eliminator roller over said second eliminator conveyor and at an angle to the path of travel of the potatoes and slightly above the surface of said second eliminator conveyor, said second eliminator roller including a flexible cylinder having a cavity therein, and means for introducing air under pressure into said cavity to thereby vary the firmness of said second roller, said floating frame mounting means including hangers depending from said stationary frame, pivots connecting said floating frame to said stationary frame hangers, and flexible adjustable means attached to said stationary frame and to said floating frame for yieldingly supporting said floating frame.

References Cited in the file of this patent

UNITED STATES PATENTS

| | | |
|---|---|---|
| 384,058 | Miller | June 5, 1888 |
| 674,573 | Dahl | May 21, 1901 |
| 930,853 | Franks et al. | Aug. 10, 1909 |
| 1,035,887 | Maull | Aug. 20, 1912 |
| 2,656,921 | Gray et al. | Oct. 27, 1953 |

FOREIGN PATENTS

| | | |
|---|---|---|
| 21,977 | Great Britain | of 1913 |